United States Patent
Jeong (10) Patent No.: US 6,366,482 B1
(45) Date of Patent: Apr. 2, 2002

(54) VOLTAGE CONVERSION CIRCUIT

(75) Inventor: Jeong Su Jeong, Seoul (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/706,795

(22) Filed: Nov. 7, 2000

(30) Foreign Application Priority Data

Dec. 31, 1999 (KR) .............................................. 99-68224

(51) Int. Cl.[7] ................................................ H02M 3/18
(52) U.S. Cl. ........................................ 363/60; 327/535
(58) Field of Search ...................... 363/59, 60; 323/312, 323/313; 327/535–538, 543

(56) References Cited

U.S. PATENT DOCUMENTS

| 5,184,030 A | * | 2/1993 | Chung et al. .......... 307/296.01 |
| 5,444,362 A | | 8/1995 | Chung et al. |
| 5,521,546 A | | 5/1996 | Kim |
| 5,874,847 A | * | 2/1999 | Kim et al. ................... 327/390 |
| 5,986,487 A | * | 11/1999 | Ridgers ....................... 327/157 |

* cited by examiner

Primary Examiner—Matthew Nguyan
(74) Attorney, Agent, or Firm—Birch, Stewart, Kolasch & Birch, LLP (57) ABSTRACT

In a conventional voltage conversion circuit, a switching control unit for controlling a pumping operation to be alternately performed is decided by a delay of an inverter, and thus a switching timing is inefficiently considerably varied according to the delay. Also, a well bias is applied to prevent a switch from being latched up. However, a large layout area is required in order to generate the well bias. A voltage conversion circuit according to the present invention can reduce a layout area and power consumption and improve conductivity and reliability, by efficiently driving a pumping capacitor by receiving an oscillation signal during a voltage pumping operation and using transitions from high to low and from low to high without overlapping each driving signal through a flip-flop switching structure, and by solving reduction of a threshold voltage of an NMOS transistor by controlling a precharge and switching transistor with a PMOS transistor.

10 Claims, 6 Drawing Sheets

VOLTAGE CONVERSION CIRCUIT

BACKGROUND OF THE INVENTION

1. Field of the Invention

The present invention relates to a voltage conversion circuit, and in particular to an improved voltage conversion circuit that can reduce a layout area and power consumption and improve conductivity and reliability, by efficiently driving a pumping capacitor by receiving an oscillation signal applied during a voltage pumping operation and using transitions from high to low and from low to high without overlapping each driving signal through a flip-flop switching structure, and by solving reduction of a threshold voltage of an NMOS transistor by controlling a precharge and switching transistor with a PMOS transistor.

2. Description of the Background Art

Figure 1:
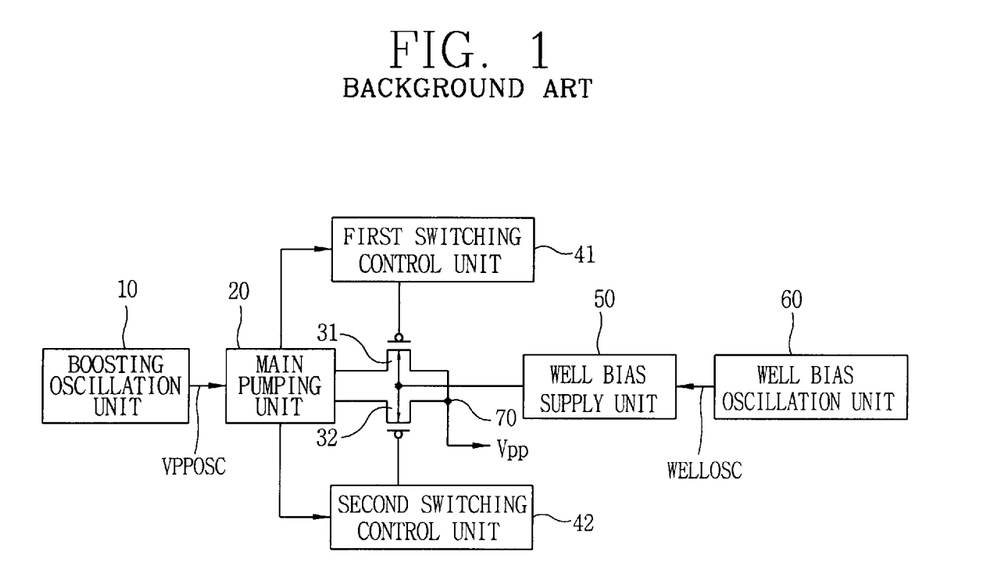
FIG. 1 is a block diagram illustrating a conventional voltage conversion circuit.

A voltage conversion circuit was disclosed on May 28, 1996 by Keum-Yong Kim under U.S. Pat. No. 5,521,546 "Voltage boosting circuit constructed on an integrated circuit substrate, as for a semiconductor memory device". FIG. 1 attached to the present specification is adopted from the U.S. Pat. No. 5,521,546.

FIG. 1 is a circuit diagram illustrating a conventional voltage conversion circuit for supplying a boosting voltage VPP to a semiconductor memory device. As shown therein, the voltage conversion circuit includes: a boosting oscillation unit 10 for generating a clock signal having a predetermined period, when the semiconductor memory device is powered up or the boosting voltage VPP is below a desired level; a main pumping unit 20 for receiving an output VPPOSC of the boosting oscillation unit 10, and pumping from the power supply voltage VCC in order to generate a desired boosting voltage VPP; first and second transmission gates 31, 32 for alternately outputting an output from the main pumping unit 20; first and second switching control unit 41, 42 for controlling a switching operation of the first and second transmission gates 31, 32 according to the output from the main pumping unit 20; a well bias supply unit 50 for supplying a bias set in an isolation well formed at the channels of the first and second transmission gates 31, 32; a well bias oscillation unit 60 for generating a clock signal having a predetermined period in order to drive the well bias supply unit 50, when the semiconductor memory device is powered up or the boosting voltage VPP is below a desired level; and a boosting node 70 formed by commonly connecting the output terminals of the first and second transmission gates 31, 32 in order to supply a desired boosting voltage VPP.

Here, when it is presumed that the conventional voltage conversion circuit is formed on a P-type substrate, the first and second transmission gates 31, 32 are respectively formed in an N-type isolation well as a PMOS transistor, and the well bias supply unit 50 supplies the predetermined bias to the isolation well where the first and second transmission gates 31, 32 consisting of the PMOS transistors are formed.

The well bias oscillation unit 60 and the well bias supply unit 50 supply the predetermined bias to the wells of the first and second transmission gates 31, 32 before starting the pumping operation, so that the voltage conversion circuit can perform the stable and precise boosting operation.

While the semiconductor memory device that is provided with the power supply voltage VCC at an initial stage is powered up, the well bias oscillation unit 60 is activated, and thus the well bias supply unit 50 is driven. A well voltage of the first and second transmission gates 31, 32 are generated by the well bias supply unit 50. Here, the voltage is applied to the wells of the first and second transmission gates 31, 32 for the stable operation of the voltage conversion circuit.

Thereafter, when the driving signal VCCH is enabled, the boosting oscillation unit 10 is activated, the boosting voltage VPP is increased to a desired level, and thus the main pumping unit 20 is enabled. The pumped voltage is transmitted as the boosting voltage VPP to the boosting node 70 through the channels of the first and second transmission gates 31, 32 that are alternately connected under the control of each gate potential provided by the first and second switching control units 41, 42.

Figure 2:
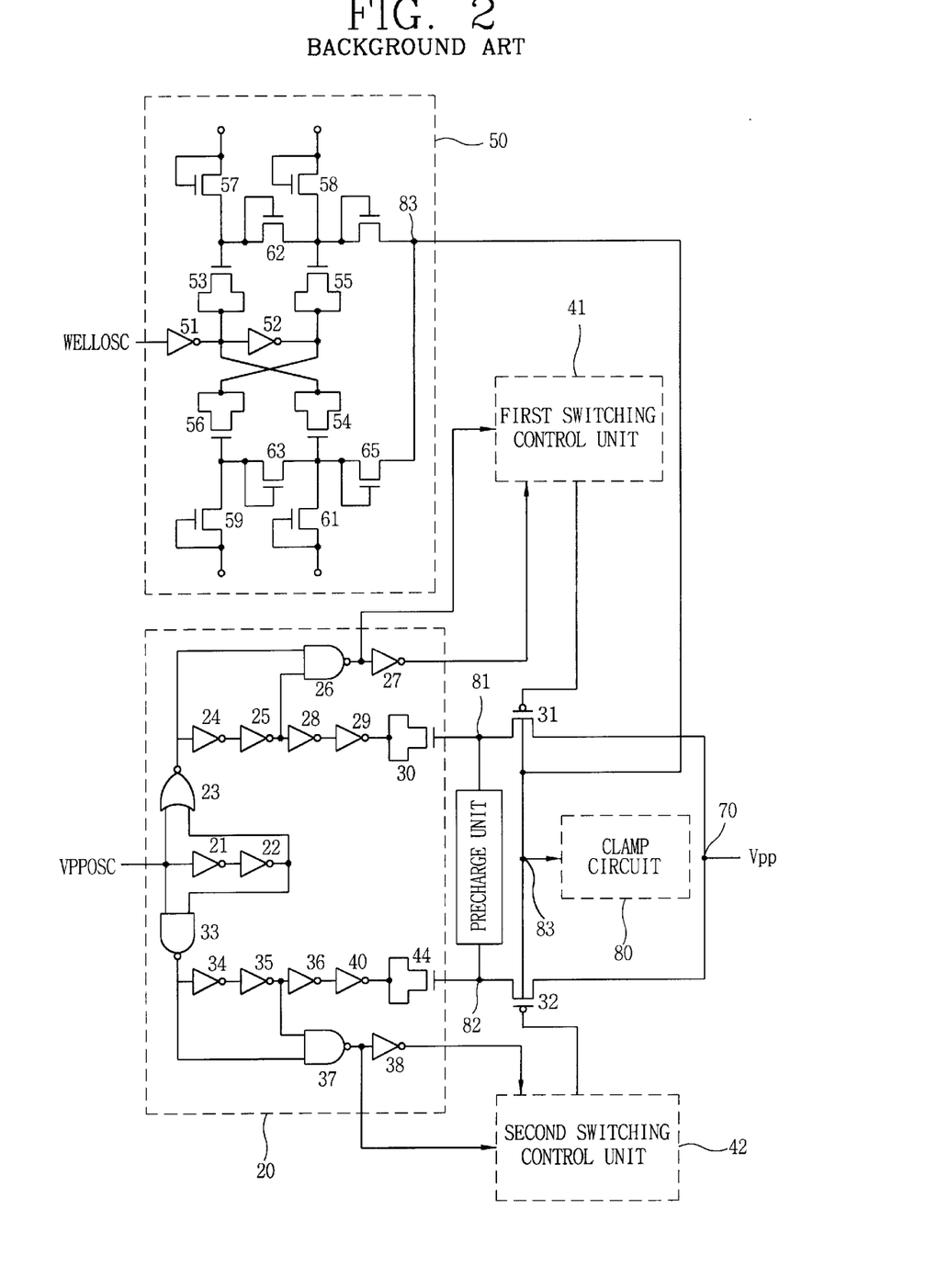
FIG. 2 is a detailed circuit diagram illustrating major components of FIG. 1.

FIG. 2 is a detailed circuit diagram illustrating major components of the conventional voltage conversion circuit as shown in FIG. 1. As shown therein, the main pumping unit 20 includes: a first NOR gate 23 having its first input terminal connected to receive a signal outputted from the boosting oscillation unit 10 and delayed by first and second inverters 21, 22 that are connected in series, and having its second input terminal connected to receive the output signal from the boosting oscillation unit 10; a first NAND gate 26 having its first input terminal connected to receive an output from the first NOR gate 23, and having its second input terminal connected to receive a signal outputted from the first NOR gate 23 and delayed by third and fourth inverters 24, 25; a fifth inverter 27 for inverting an output from the first NAND gate 26; a first pumping capacitor 30 having its first terminal connected to receive a signal outputted from the first NOR gate 23 and delayed by sixth and seventh inverters 28, 29, and having its second terminal connected to a first node 81 connected to a source of the first transmission gate 31; a second NAND gate 33 having its first input terminal connected to receive a signal VPPOSC outputted from the boosting oscillation unit 10 and delayed by the first and second inverters 21, 22, and having its second input terminal connected to receive the output signal VPPOSC from the boosting oscillation unit 10; a seventh inverter 34 for inverting an output from the second NAND gate 33; a third NAND gate 37 having its first input terminal connected to receive a signal outputted from the seventh inverter 34 and delayed by eighth and ninth inverters 35, 36, and having its second input terminal connected to receive the output from the seventh inverter 34; a tenth inverter 38.for inverting and outputting an output from the third NAND gate 37; eleventh and twelfth inverters 39, 40 for re-delaying the signal delayed by the eighth and ninth inverters 35, 36; and a second pumping capacitor 43 having its first terminal connected to receive a signal delayed by the eleventh and twelfth inverters 39, 40, and having its second terminal connected to a second node 82 connected to a source of the second transmission gate 32. Here, the output from the first NAND gate 26 and the signal inverted by the fifth inverter 27 are applied to the first switching control unit 41 as an input signal. The output from the third NAND gate 37 and the signal inverted by the tenth inverter 38 are applied to the second switching control unit 42 as an input signal.

The well bias supply unit 50 includes: first and second inverter 51, 52 for sequentially inverting an output signal WELLOSC of the well bias oscillation unit 60; first and second capacitors 53, 54 having their first terminals connected to receive an output from the first inverter 51; third and fourth capacitors 55, 56 having its first terminals connected to receive an output from the second inverter 52; first to fourth NMOS transistors 57, 58, 59, 61 connected as resistances in order to apply the power supply voltage VCC to second terminals of the first to fourth NMOS capacitors 53~56; a fifth NMOS transistor 62 connected between the second terminals of the first and third capacitors 53, 55 and diode-connected; a sixth NMOS transistor 63 connected between the second terminal of the third capacitor 55 and the well node 83, and diode-connected; a seventh NMOS transistor 64 connected between the second terminals of the second and fourth capacitors 54, 56 and diode-connected; and an eighth NMOS transistor 65 connected between the second terminal of the fourth capacitor 56 and the well node 83, and diode-connected.

The operation of the voltage conversion circuit will now be described with reference to the accompanying drawings.

Figure 3:
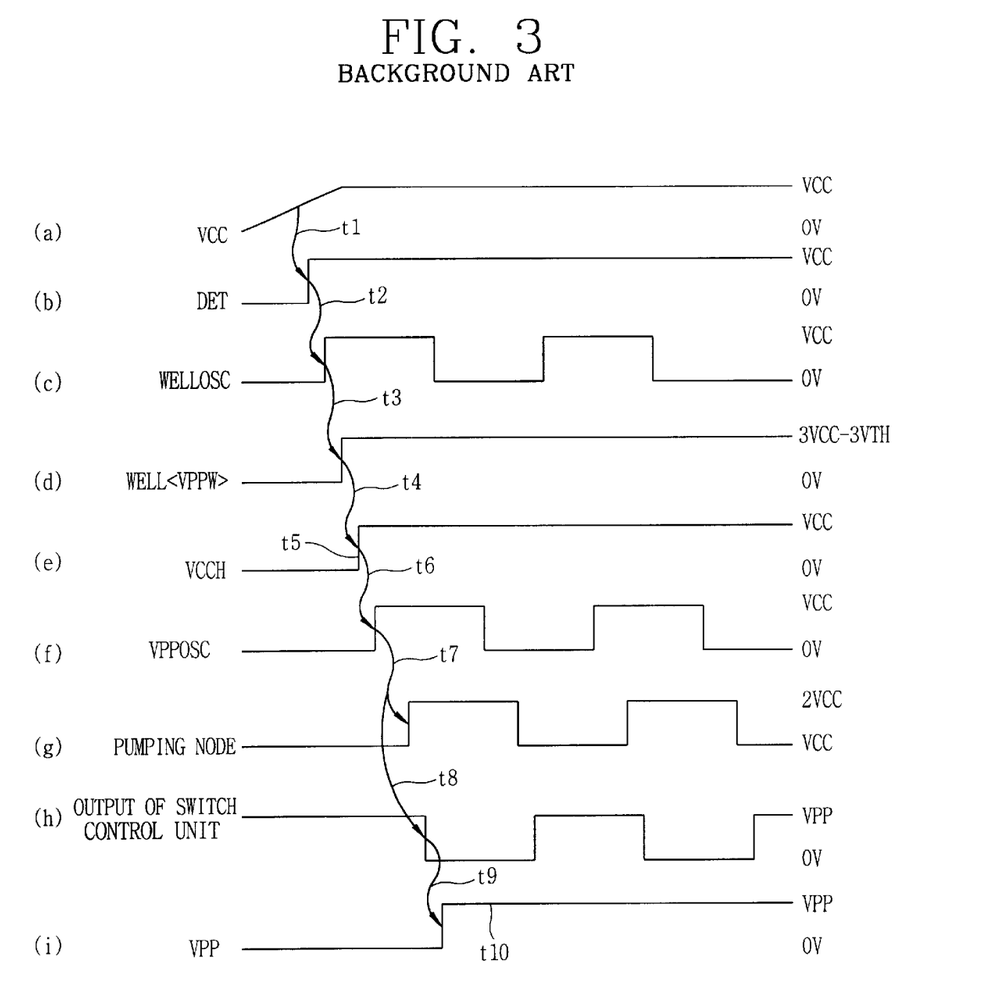
FIG. 3 is an operational timing diagram of FIG. 1.

FIG. 3 is a timing diagram of a signal for the operation of the voltage conversion circuit as shown in FIG. 1. As illustrated therein, in a first step t1, when the semiconductor memory device is powered up before the driving signal VCCH is enabled at a high level, and when the power supply voltage VCC is applied, if the boosting voltage VPPP is below the predetermined level (for example, VCC-VTH level), an output signal DET of a boosting voltage detector (not shown) that is activated is enabled from a low level to a high level. In a second step t2, the well bias oscillation unit 60 is activated in order to generate the oscillation signal WELLOSC. In a third step t3, the well bias supply unit 50 is activated by the oscillation signal WELLOSC in order to apply a well voltage WELL<VPPW> to the first and second transmission gates 31, 32. Here, the oscillation signal WELLOSC of the well bias oscillation unit 60 is applied to the well bias supply unit 50 and is transited, thereby performing a double pumping operation. Accordingly, the well voltage WELL<VPPW> of the well bias supply unit 50 becomes 3VCC-3VTH level. At this time, in case the output level of the well bias supply unit 50 exceeds VCC+4VTH level, the voltage level of the well node 83 is clamped by a clamp circuit 80. Thereafter, in a fifth step t5, when the power supply voltage VCO is increased into a predetermined level, if the driving signal VCOH is enabled at a high level and the output signal DET from the boosting voltage detector (not shown) is enabled at a high level at the same time, in a sixth step t6, the boosting oscillation unit 10 is activated. Accordingly, the output'signal VPPOSC of the boosting oscillation unit 10 is generated, and thus the main pumping unit 20 performs the pumping operation of the boosting voltage VPP. That is, when the output signal VPPOSC of the boosting oscillation unit 10 is enabled at a low level, the first pumping capacitor 29 carries out the pumpingoperation through the first and second inverters 24, 25 which are connected in series to the first NOR gate 23. In a seventh step t7, the pumping node 81 precharged to the power supply voltage VCC level by a precharge unit 90 is pumped to 2VCC level. Here, in an eighth step, when the output signal of the first switching control unit 41 has a phase opposite to a signal phase in the first pumping node 81, and is enabled to 0V at the boosting voltage VPP level, in a ninth step t9, the boosting voltage VPP of the boosting node 70 is allowed so that the voltage level of the first pumping node 81 can increase into 2VCC level through the channel of the first transmission gate 31. In the ninth step t9, when the output signal VPPOSC of the boosting oscillation unit 10 is enabled at a low level, the second pumping capacitor 44 performs the pumping operation through the seventh, eighth, eleventh and twelfth inverters 35, 36, 39, 40 that are connected in series to the second NAND gate 37. The second pumping node 82 precharged to the VCC level by the precharge unit 90 is pumped to the 2VCC level. Here, in the eight step t8, when the output signal of the second pumping control unit 42 has a phase opposite to a signal phase in the second pumping node 82 and is enabled to 0V at the boosting voltage VPP level, in the ninth step t9, the boosting voltage VPP of the boosting node 70 is permitted so that the voltage level of the second pumping node 82 can be increased to the 2VCC level through the channel of the second transmission gate 32. In a tenth step t10, in order to obtain a desired boosting voltage VPP by repeatedly carrying out the above steps, the first and second pumping capacitors 30, 44 are operated in respond to a toggle input of the output signal VPPOSC of the boosting oscillation unit 10. At this time, the well bias is already applied to the wells of the first and second transmission gates 31, 32 by the well bias supply unit 50 before the main pumping unit 20 performs the pumping operation, and thus the-normal boosting operation is carried out without a latch up phenomenon.

In case the boosting voltage VPP level is decreased by the active operation of many circuits of a single integrated circuit, the operation as shown in FIG. 3 is consecutively performed, thereby increasing the boosting voltage VPP level. The operation is carried out due to the power up of the single integrated circuit including the circuit boosting the voltage.

Figure 4:
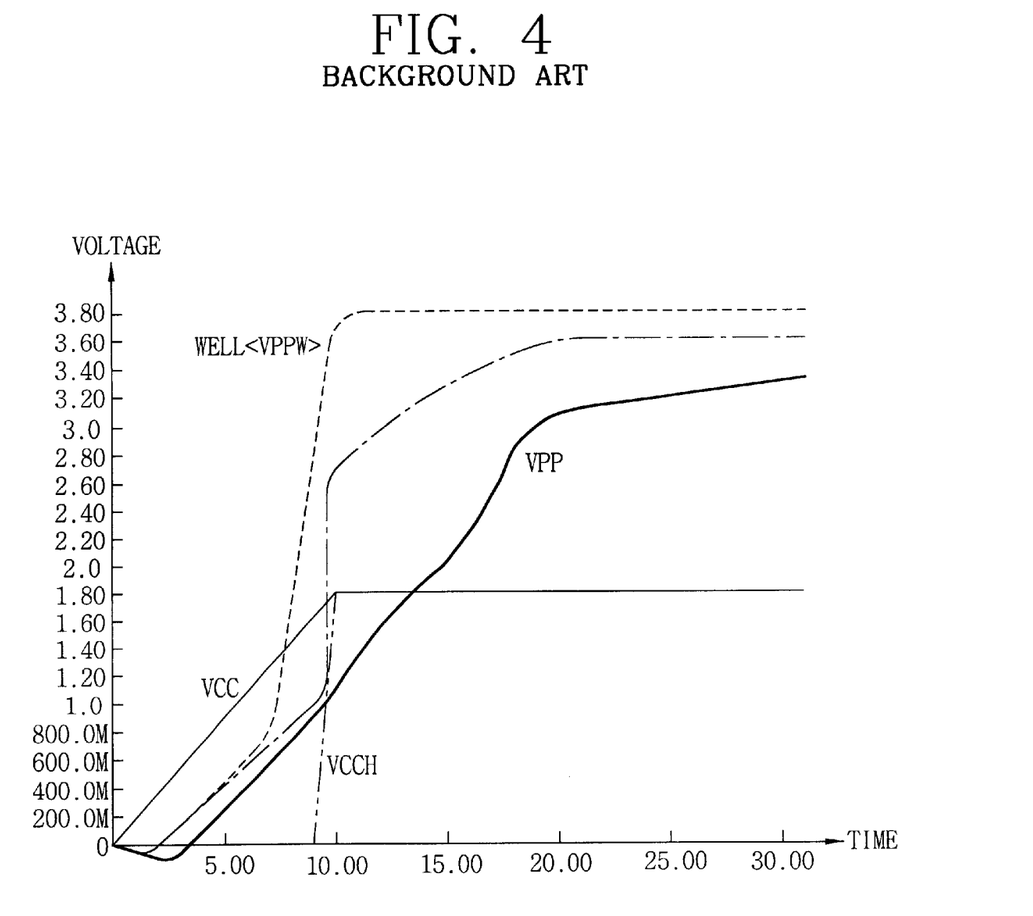
FIG. 4 is a graph showing waveforms in regard to voltage boosting effects of FIG. 1.

FIG. 4 is a graph showing waveforms relating to boosting effects of the conventional voltage conversion circuit. As depicted therein, when the power supply voltage VCC is enabled from 0V to 1.8V, if the power supply voltage VCC becomes approximately 1.6V, an output signal WELL of the well bias supply unit 50 exceeds 3.6V. The driving signal VCCH is enabled when the power supply voltage VCC reaches into a stable level, namely 1.8V, thereby activating the boosting oscillation unit 10. The activation of the boosting oscillation unit 10 drives the first and second pumping nodes 81, 82 at 2VCC peak level. In order to maintain the boosting voltage VPP at 3.6V, the operation of the first and second transmission gates 31, 32 alternately apply the 2VCC peak level to the boosting node 70.

However, in the conventional voltage conversion circuit, the switching control unit for controlling the pumping operation to be alternately performed is decided by the delay of the inverter, and thus a switching timing is inefficiently considerably varied according to the delay. In addition, the well bias is applied to prevent the switch from being latched up. A large layout area is required in order to generate the well bias.

SUMMARY OF THE INVENTION

Accordingly, it is an object of the present invention to provide a voltage conversion circuit that can efficiently drive a boosting voltage circuit by performing a switching operation without conflict of each signal by using a flip flop structure, when transiting an output signal of an external oscillator, and that can generate a well bias by employing a simple pumping circuit.

In order to achieve the above-described object of the present invention, there is provided a voltage conversion circuit including: a driving signal generating unit consisting of a flip flop structure, and generating first and second driving signals; first and second pumping units for pumping a voltage by the first and second driving signals; first and second switches for selectively outputting the voltage pumped by the first and second pumping units; and a well bias voltage generating unit formed in the same manner as the first and second pumping units, and generating a well bias voltage to be applied to the first and second switches,

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A voltage conversion circuit in accordance with a preferred embodiment of the present invention will now be described in detail with reference to the accompanying drawings.

Figure 5:
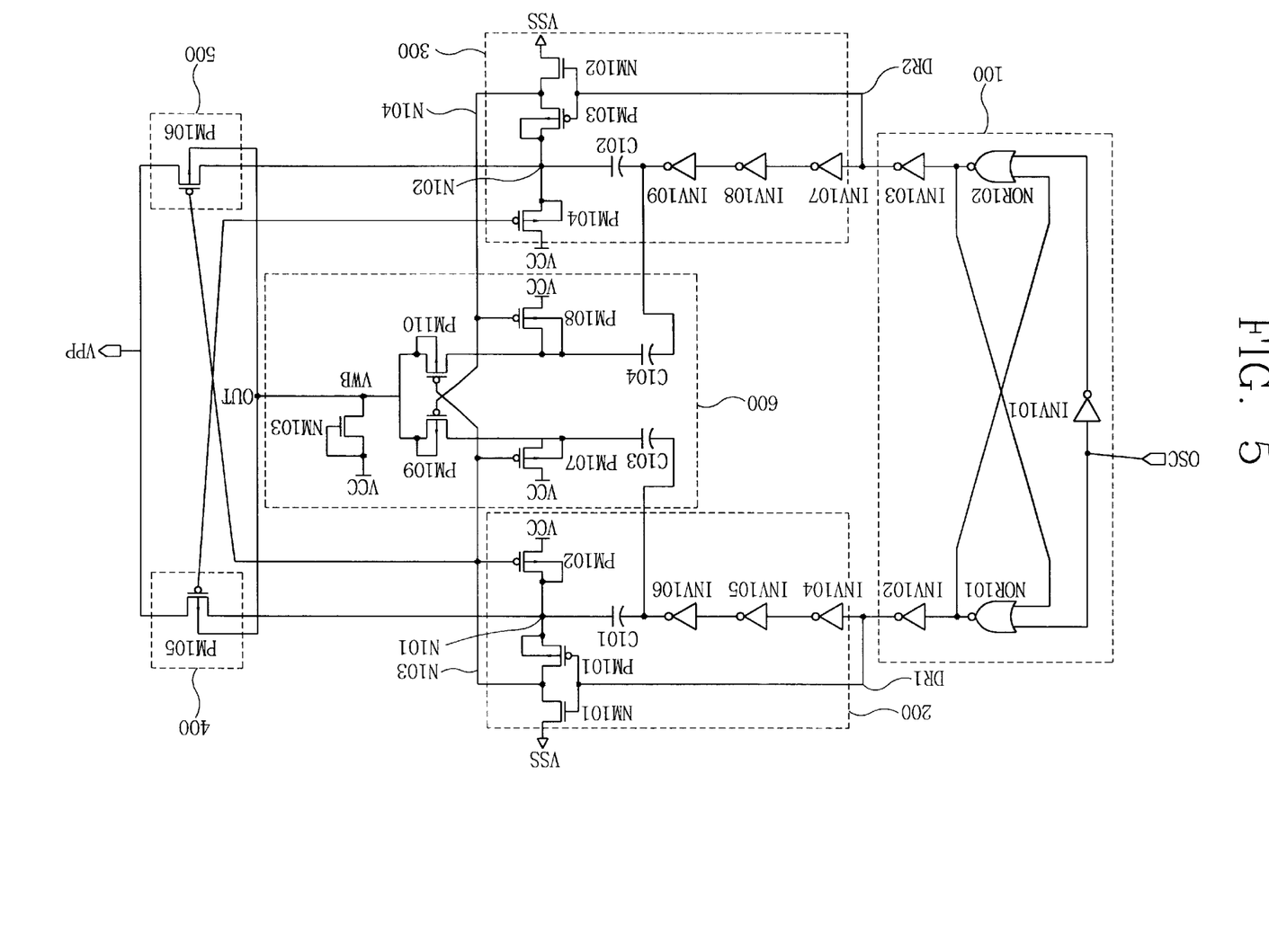
FIG. 5 is a circuit diagram illustrating a voltage conversion circuit in accordance with the present invention.

FIG. 5 is a circuit diagram illustrating the voltage conversion circuit in accordance with the present invention. As shown therein, the voltage conversion circuit includes: a driving signal generating unit 100 for generating first and second driving signals DR1, DR2 according to an oscillation signal OSC of a boosting oscillation circuit (not shown); first and second pumping units 200, 300 for pumping a voltage according to the first and second driving signals DR1, DR2; first and second switches 400, 500 for selectively outputting the voltage pumped by the first and second pumping units 200, 300; and a well bias voltage generating unit 600 for generating a well bias voltage VWB to be applied to the first and second switches 400, 500.

Here, the driving signal generating unit 100 includes: a first inverter INV101 for inverting the oscillation signal OSC; first and second NOR gates NOR101, NOR102 having their first input terminals connected to receive the oscillation signal OSC and an inverted signal thereof, and having their second input terminals connected to respectively receive their outputs for constituting a flip flop structure; and second and third inverters INV102, INV103 for inverting outputs from the first and second NOR gates NOR101, NOR102, and outputting the first and second driving signals DR1, DR2, respectively.

The first pumping unit 200 includes: fourth to sixth inverters INV104~INV106 for sequentially inverting the output DR1 from the second inverter INV102 of the driving signal generating unit 100; a first capacitor C101 having one terminal connected to an output from the sixth inverter INV106; a first NMOS transistor NM101 and a first PMOS transistor PM101 connected in series between the power supply voltage VCC and the ground voltage VSS, and having their gates commonly connected to receive the first driving signal DR1 of the driving signal generating unit 100, a substrate and a source of the first PMOS transistor PM101 being commonly connected; and a second PMOS transistor PM102 having its gate connected to a third node N103 where the drains of the first PMOS transistor PM101 and the first NMOS transistor NM101 are commonly connected, and having its substrate commonly connected to its drain, the other terminal of the first capacitor C101 being connected to a first node N101 where the source of the first PMOS transistor PM101 and the drain of the second PMOS transistor PM102 are commonly connected.

In addition, identically to the first pumping unit 200, the second pumping unit 300 includes: seventh to ninth inverters INV107~INV109, a second capacitor C102, a third PMOS transistor PM103, a fourth PMOS transistor PM104 and a second NMOS transistor NM102. That is, the second pumping unit 300 includes: the seventh to ninth inverters INV107~INV109 for sequentially inverting the output DR2 from the third inverter INV103 of the driving signal generating unit 100; the second capacitor C102 having one terminal connected to an output from the ninth inverter INV109; the second NMOS transistor NM102 and a third PMOS transistor PM103 connected in series between the power supply voltage VCC and the ground voltage VSS, and having their gates commonly connected to receive the second driving signal DR2 of the driving signal generating unit 100, a substrate and a source of the third PMOS transistor PM103 being commonly connected; and the fourth PMOS transistor PM104 having its gate connected to a fourth node N104 where the drains of the third PMOS transistor PM103 and the second NMOS transistor NM102 are commonly connected, and having its substrate commonly connected to its drain, the other terminal of the second capacitor C102 being connected to a second node N102 where the source of the third PMOS transistor PM103 and the drain of the fourth PMOS transistor PM104 are commonly connected.

In order to selectively transmit the voltage of the first node N101 where the source of the first PMOS transistor PM101, the drain of the second PMOS transistor PM102 and the other terminal of the first capacitor C101 are commonly connected, the first switch 400 consists of a fifth PMOS transistor PM105 having its gate connected to receive a voltage of the fourth node N104 where the drains of the third PMOS transistor PM103 and the second NMOS transistor NM102 of the second pumping unit 300 are commonly connected, and having its substrate connected to receive the well bias voltage VWB of the well bias voltage generating unit 600.

In addition, identically to the first switch 400, the second switch 500 includes a sixth PMOS transistor PM106. That is, in order to selectively transmit the voltage of the second node N102 where the source of the third PMOS transistor PM103, the drain of the fourth PMOS transistor PM104 and the other terminal of the second capacitor C102 are commonly connected, the second switch 500 consists of the sixth PMOS transistor PM106 having its gate connected to receive a voltage of the third node N103 where the drains of the first PMOS transistor PM101 and the first NMOS transistor NM101 of the first pumping unit 200 are commonly connected, and having its substrate connected to receive the well bias voltage VWB of the well bias voltage generating unit 600.

The well bias voltage generating unit 600 includes: third and fourth capacitors C103, C104 having their one side terminals connected to one side terminals of the first and second capacitors C101, C102; seventh and eighth PMOS transistors PM107, PM108 having their sources connected to receive the power supply voltage VCC, having their commonly-connected drain and substrate connected to the other side terminals of the third and fourth capacitors C103, C104, and having their gates connected to the third and fourth nodes N103, N104, respectively; ninth and tenth PMOS transistors PM109, PM110 having their sources connected to the other terminals of the third and fourth capacitors C103, C104, respectively, having their drains commonly connected to form an output terminal OUT, and having their gates connected to the third and fourth nodes N103, N104, respectively; and a third NMOS transistor NM103 having its gate and drain commonly connected to receive the power supply voltage VCC, the drain of which being connected to the output terminal OUT outputting the well bias voltage VWB.

Here, the third NMOS transistor NM103 is used to precharge the output terminal OUT at the power supply voltage VCC level.

The operation of the voltage conversion circuit in accordance with the preferred embodiment of the present invention will now be described in detail with reference to the accompanying drawings.

Figure 6:
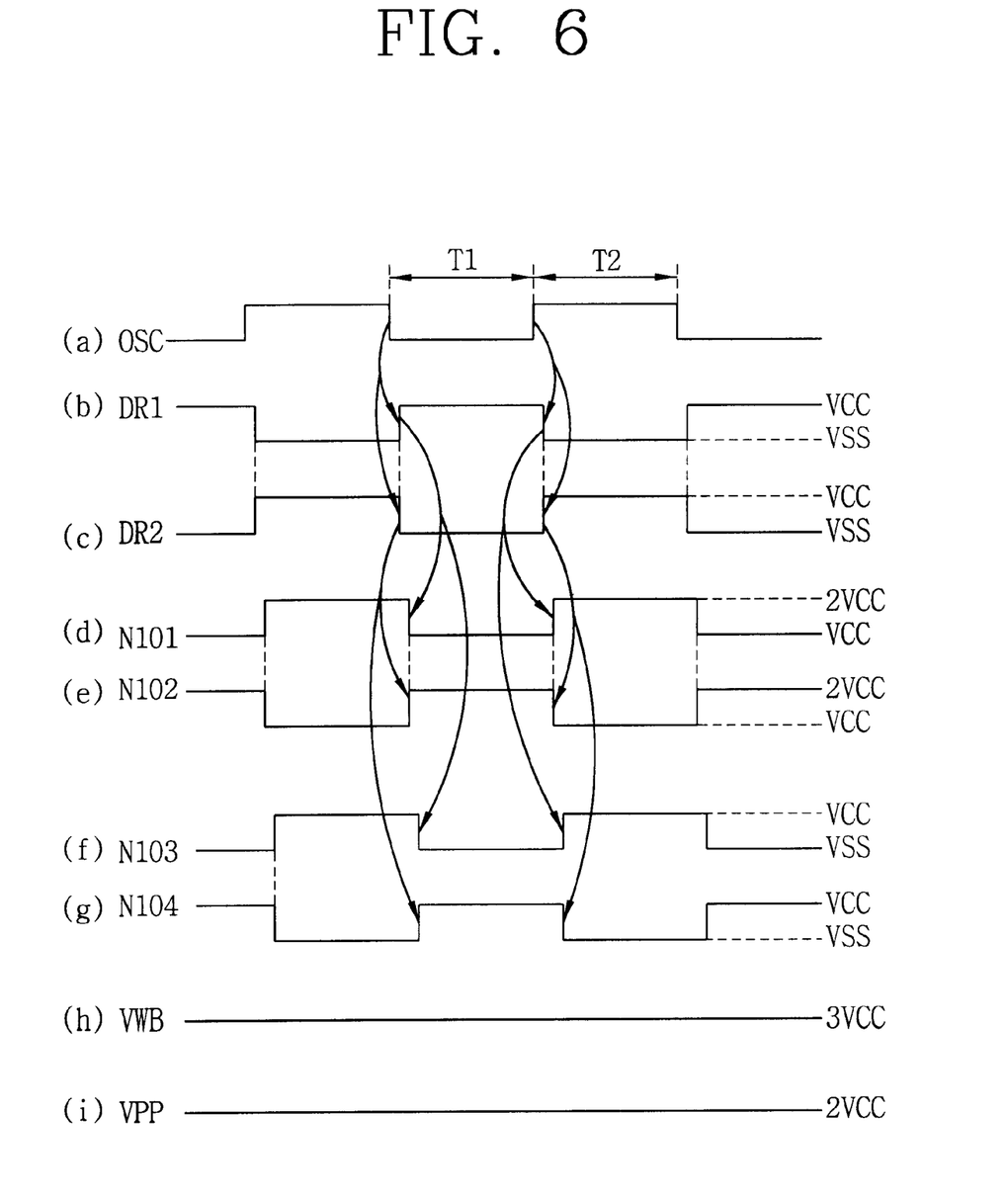
FIG. 6 is an operational timing diagram of FIG. 5.

FIG. 6 is an operational timing diagram of signals for the operation of the voltage conversion circuit as shown in FIG. 5. As depicted in a first period Ti in FIG. 6, when the oscillation signal OSC is transited from a high level to a low level, the oscillation signal OSC is inverted by the first inverter INV101, and the output from the second NOR gate NOR102 becomes a low level. Thereafter, the output from the first NOR gate NOR101 becomes a high level.

Conversely, as shown in a second period T2 in FIG. 6, when the oscillation signal OSC is transited from a low level to a high level, the output from the first NOR gate NOR101 becomes a low level, and the output from the second NOR gate NOR102 becomes a high level.

Accordingly, the output of the first NOR gate NOR101 and the output of the second NOR gate NOR102 are not overlapped.

The outputs from the first and second NOR gates NOR101, NOR102 are inverted by the second and third inverters INV102, INV103, respectively, and outputted as the first and second driving signals DR1, DR2 for driving the first and second pumping units 200, 300. As a result, as illustrated in FIGS. 6(b) and 6(c), the first and second driving signals DR1, DR2 are alternately enabled.

On the other hand, when the oscillation signal OSC is transited from a high level to a low level, the first driving signal DR1 which is at a low level is applied to the commonly-connected gates of the first PMOS transistor PM101 and the first NMOS transistor NM101. Accordingly, the first PMOS transistor PM101 is turned on, the first NMOS transistor NM101 is turned off, and thus the second PMOS transistor PM102 is turned on. Therefore, the first node N101 is connected to the power supply voltage VCC and precharged.

At the same time, the first driving signal DR1 which is at a low level is sequentially inverted by the.,fourth to sixth inverters INV104~INV106, and applied is to one terminal of the first capacitor C101. Accordingly, the voltage between the two terminals of the first capacitor C101 is increased to the power supply voltage VCC. That is, one terminal of the first capacitor C101 receives the low level signal that is the second driving signal DR2 sequentially inverted by the fourth to sixth inverters INV104~INV106, and the other terminal thereof is connected to the power supply voltage VCC through the second PMOS transistor PM102. Then, the first capacitor C101 pumps a charged voltage, when the output from the sixth inverter INV106 becomes a high level. As a result, the voltage level of the first node N101 becomes 2VCC.

Here, the second driving signal DR2 which is at a high level is applied to the commonly-connected gates of the third PMOS transistor PM103 and the second NMOS transistor NM102. Accordingly, the third PMOS transistor PM103 is turned off, the second NMOS transistor NM102 is turned on, and thus the fourth node N104 is connected to the ground voltage VSS through the second NMOS transistor NM102. Thus, the fourth PMOS transistor PM104 is turned on. At this time, since the level of the fourth node N104 is the ground voltage VSS level, the fifth PMOS transistor PM105 that is operated as the first switch 400 is turned on, and thus the voltage 2VCC charged at the first node N101 is outputted to a boosting terminal N105 as a boosting voltage VPP through the fifth PMOS transistor PM105.

Conversely, when the oscillation signal OSC is transited from a low level to a high level, the second driving signal DR2 that is at a low level is applied to the commonly-connected gates of the third PMOS transistor PM103 and the second NMOS transistor NM102. Accordingly, the third PMOS transistor PM103 is turned on, the second NMOS transistor NM102 is turned off, and thus the fourth PMOS transistor PM104 is turned on. As a result, the second node N102 is connected to the power supply voltage VCC and precharged.

At the same time, the second driving signal DR2 which is at a low level is sequentially inverted by the seventh to ninth inverters INV107~INV109, and applied to one terminal of the second capacitor C102. Accordingly, the voltage between the two terminals of the second capacitor C102 is increased to the power supply voltage VCC. That is, one terminal of the second capacitor C102 receives the low level signal that is the first driving signal DR1 sequentially inverted by the seventh to ninth inverters INV107~INV109, and the other terminal thereof is connected to the power supply voltage VCC through the fourth PMOS transistor PM104. Then, the second capacitor C102 pumps a charged voltage, when the output from the ninth inverter INV109 becomes a high level. Consequently, the voltage level of the second node N102 becomes 2VCC.

Here the first driving signal DR1 which is at a high level is applied to the commonly-connected gates of the first PMOS transistor PM101 and the first NMOS transistor NM101. Accordingly, the first PMOS transistor PM101 is turned off, the first NMOS transistor NM101 is turned on, and thus the third node N103 is connected to the ground voltage VSS through the first NMOS transistor NM101. Thus, the second PMOS transistor PM102 is turned on. At this time, since the level of the third node N103 is the ground voltage VSS level, the sixth PMOS transistor PM106 that is operated as the second switch 500 is turned on, and thus the voltage 2VCC charged at the second node N102 is outputted to the boosting terminal N105 as the boosting voltage VPP via the sixth PMOS transistor PM106.

As described above, the first and second pumping units 200, 300 alternately output the voltage 2VCC charged at the first node N101 or second node N102 to the boosting node N105 by the switching operation, thereby obtaining the stable boosting voltage VPP.

At this time, in order to prevent the fifth and sixth PMOS transistors PM105, PM106 from being latched up when the well bias becomes lower than a voltage between the source and the drain of the PMOS transistor, a well bias generating unit 700 for generating the boosting voltage VPP is further included.

Transistors composing the well bias generating unit 700 may be designed much smaller than the transistors of the pumping circuit in accordance with the present invention because the transistors only charge the N-well of the PMOS transistor.

Accordingly, as shown in FIG. 6, the well bias VPPW is pumped when the boosting voltage VPP is pumped, and applied to the wells of the fifth and sixth PMOS transistors PM105, PM106 operated as the first and second switches 400, 500, thereby preventing the fifth and sixth PMOS transistors PM105, PM106 from being latched up.

As discussed earlier, the voltage conversion circuit can reduce a layout area and power consumption and improve conductivity and reliability, by efficiently driving the pumping capacitor by receiving the oscillation signal applied when pumping the boosting voltage and using transitions from high to low and from low to high without overlapping each driving signal through the flip-flop switching structure, and by designing the well bias generating unit to be operated identically to the main pumping unit according to the oscillation signal, without using an additional circuit.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A voltage conversion circuit comprising:
    a driving signal generating unit consisting of a flip flop structure, and generating first and second driving signals according to an oscillation signal;
    first and second pumping units for pumping a voltage according to the first and second driving signals;
    first and second switches for selectively outputting the voltage pumped by the first and second pumping units; and
    a well bias voltage generating unit having first and second capacitors capable of simultaneously receiving first and second sequentially inverted driving signals from the first and second pumping units, and generating a well bias voltage to be applied to the first and second switches; and
    first, second, third and fourth nodes connecting first and second pumping units, first and second switches and the well bias voltage generating unit.

2. The voltage conversion circuit according to claim 1, wherein the driving signal generating unit comprises:
    a first inverter for inverting the oscillation signal;
    first and second NOR gates having their first input terminals connected to receive the oscillation signal and an inverted signal thereof, and having their second input terminals connected to respectively receive their outputs; and
    second and third inverters for inverting outputs from the first and second NOR gates, and outputting the first and second driving signals, respectively.

3. The voltage conversion circuit according to claim 1, wherein the first pumping unit comprises:
    first, second, and third inverters for sequentially inverting the output from the second inverter of the driving signal generating unit;
    a capacitor having its input terminal connected to an output from the third inverter and to the first capacitor of the well bias voltage generating unit;
    an NMOS transistor and a first PMOS transistor connected in series between the power supply voltage and the ground voltage, and having their gates commonly connected to receive the first driving signal of the driving signal generating unit, a substrate and a source of the first PMOS being commonly connected; and
    a second PMOS transistor having its gate connected to a third node where the drains of the first PMOS transistor and the NMOS transistor are commonly connected, and having its substrate commonly connected to its drain, the other terminal of the capacitor being connected to a first node where the source of the first PMOS transistor and the drain of the second PMOS transistor are commonly connected.

4. The voltage conversion circuit according to claim 1, wherein the second pumping unit comprises:
    first, second, and third inverters for sequentially inverting the output from the third inverter of the driving signal generating unit;
    a capacitor having its input terminal connected to an output from the third inverter and to the second capacitor of the well bias voltage generating unit;
    an NMOS transistor and a first PMOS transistor connected in series between the power supply voltage and the ground voltage, and having their gates commonly connected to receive the second driving signal of the driving signal generating unit, a substrate and a source of the first PMOS transistor being commonly connected; and
    a second PMOS transistor having its gate connected to a fourth node where the drains of the first PMOS transistor and the NMOS transistor are commonly connected, and having its substrate commonly connected to its drain, the other terminal of the capacitor being connected to a second node where the source of the first PMOS transistor and the drain of the second PMOS transistor are commonly connected.

5. The voltage conversion circuit according to claim 1, wherein the first switch comprises:
    a PMOS transistor having its gate connected to receive a voltage of the fourth node where the drains of the first PMOS transistor and the NMOS transistor of the second pumping unit are commonly connected, and having its substrate connected to receive the well bias voltage of the well bias voltage generating unit.

6. The voltage conversion circuit according to claim 1, wherein the first switch selectively transmits the voltage of the first node where the source of the first PMOS transistor, the drain of the second PMOS transistor and the other terminal of the capacitor of the first pumping unit are commonly connected, according to a level of a fourth node of the second pumping unit.

7. The voltage conversion circuit according to claim 1, wherein the second switch comprises:
    a PMOS transistor having its gate connected to receive a voltage of the third node where the drains of the first PMOS transistor and the NMOS transistor of the first pumping unit are commonly connected, and having its substrate connected to receive the well bias voltage of the well bias voltage generating unit.

8. The voltage conversion circuit according to claim 1, wherein the second switch selectively transmits the voltage of the second node where the source of the first PMOS transistor, the drain of the second PMOS transistor and the other terminal of the capacitor of the second pumping unit are commonly connected, according to a level of the third node of the first pumping unit.

9. The voltage conversion circuit according to claim 1, wherein the well bias voltage generating unit comprises:
    first and second PMOS transistors having their sources connected to receive the power supply voltage, having their commonly-connected drain and substrate connected to the respective outputs of the first and second capacitors, and having their gates connected to the third and fourth nodes, respectively; and third and fourth PMOS transistors having their sources connected to the outputs of the first and second capacitors, respectively, having their drains commonly connected to form an output terminal, and having their gates connected to the third and fourth nodes, respectively; and an NMOS transistor having its gate and drain commonly connected to receive the power supply voltage, the drain being connected to the output terminal outputting the well bias voltage.

10. The voltage conversion circuit according to claim 9, wherein the NMOS transistor of the well bias voltage generating unit is connected to precharge said output terminal.

* * * * *